Patented Aug. 24, 1954

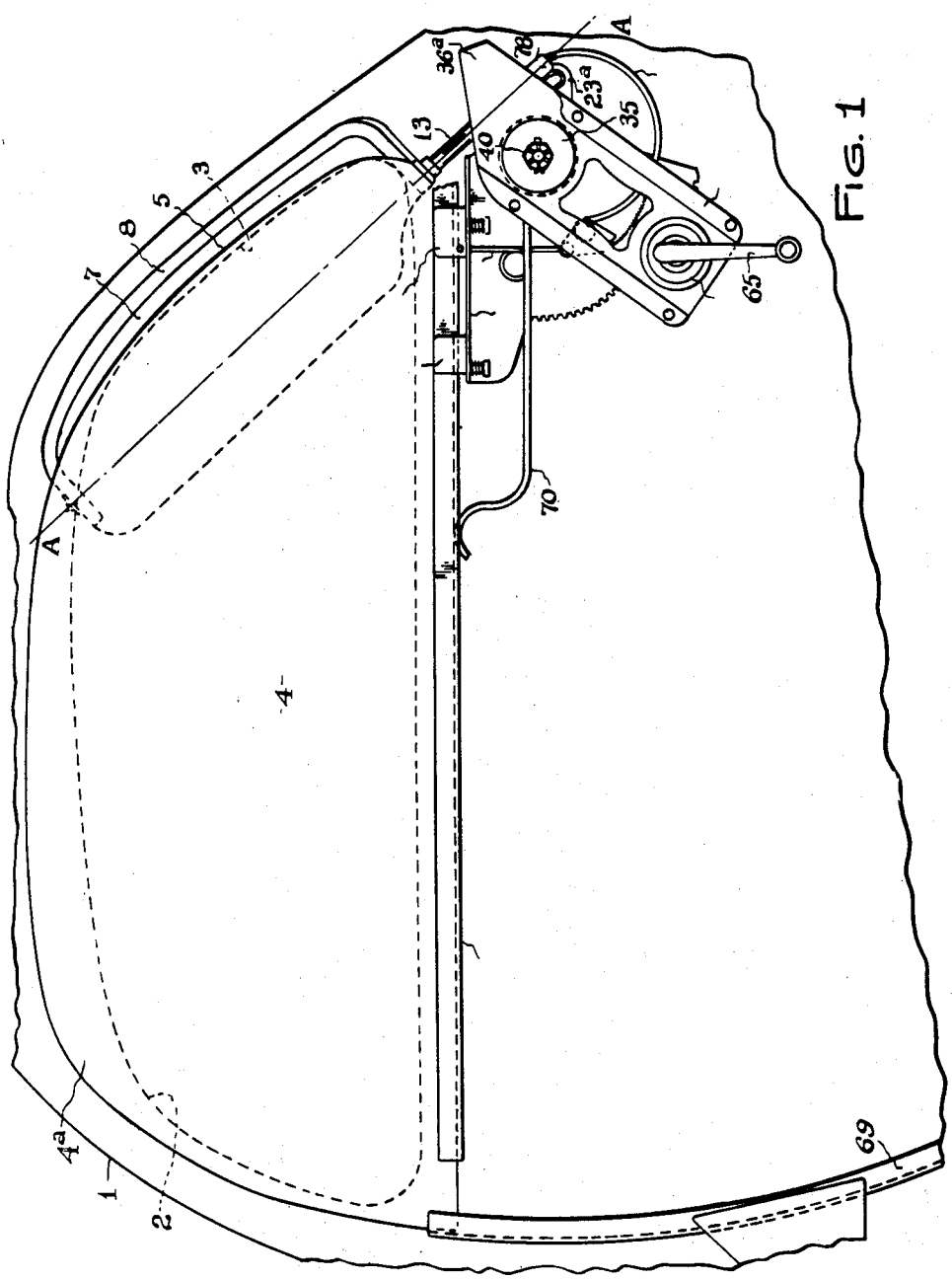

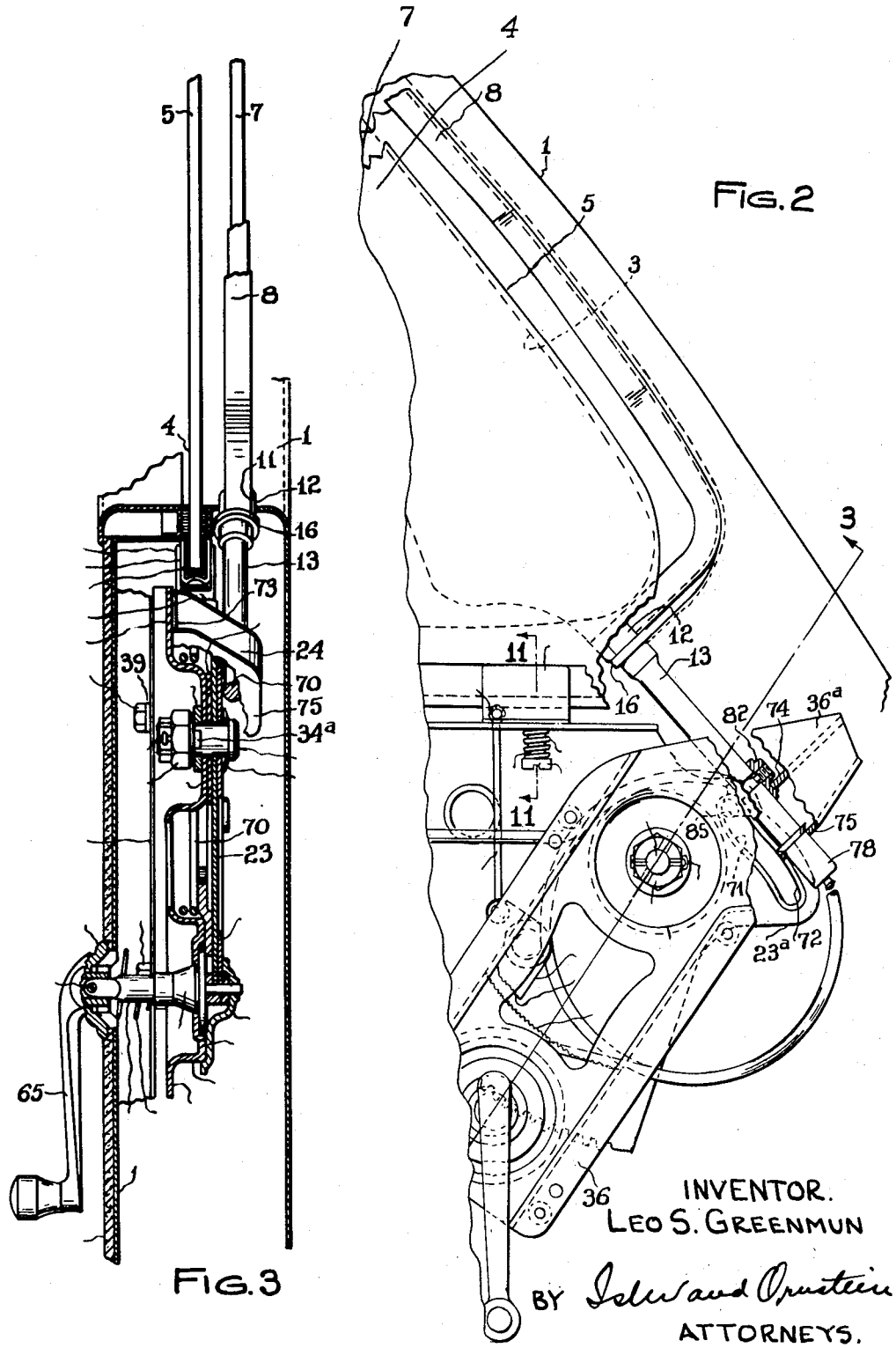

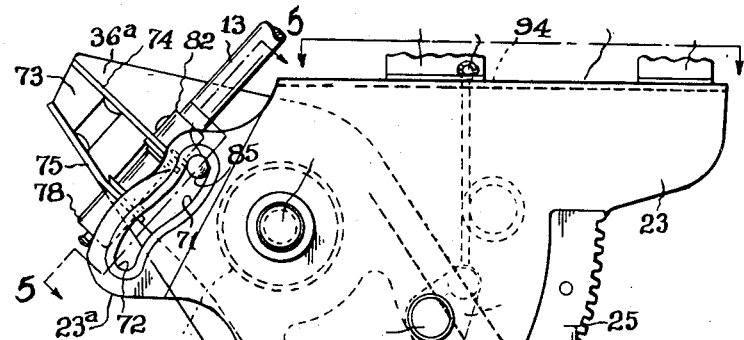
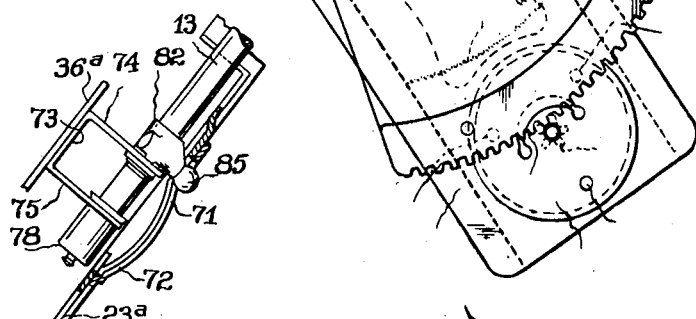
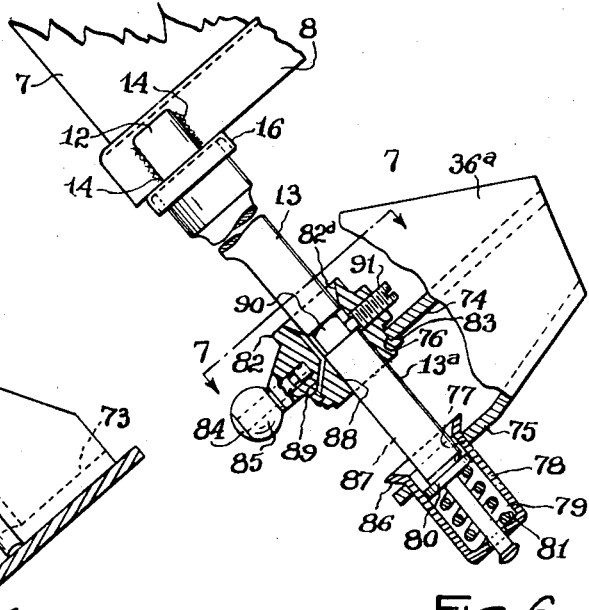
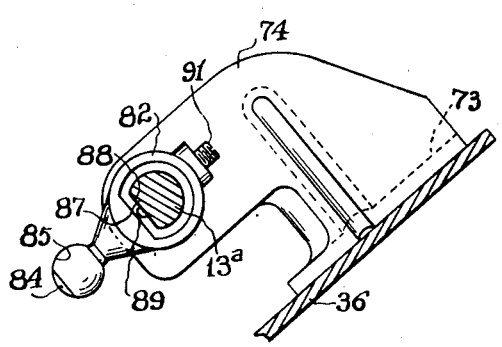
Fig. 4
Fig. 5
Fig. 6
Fig. 7
INVENTOR.
LEO S. GREENMUN

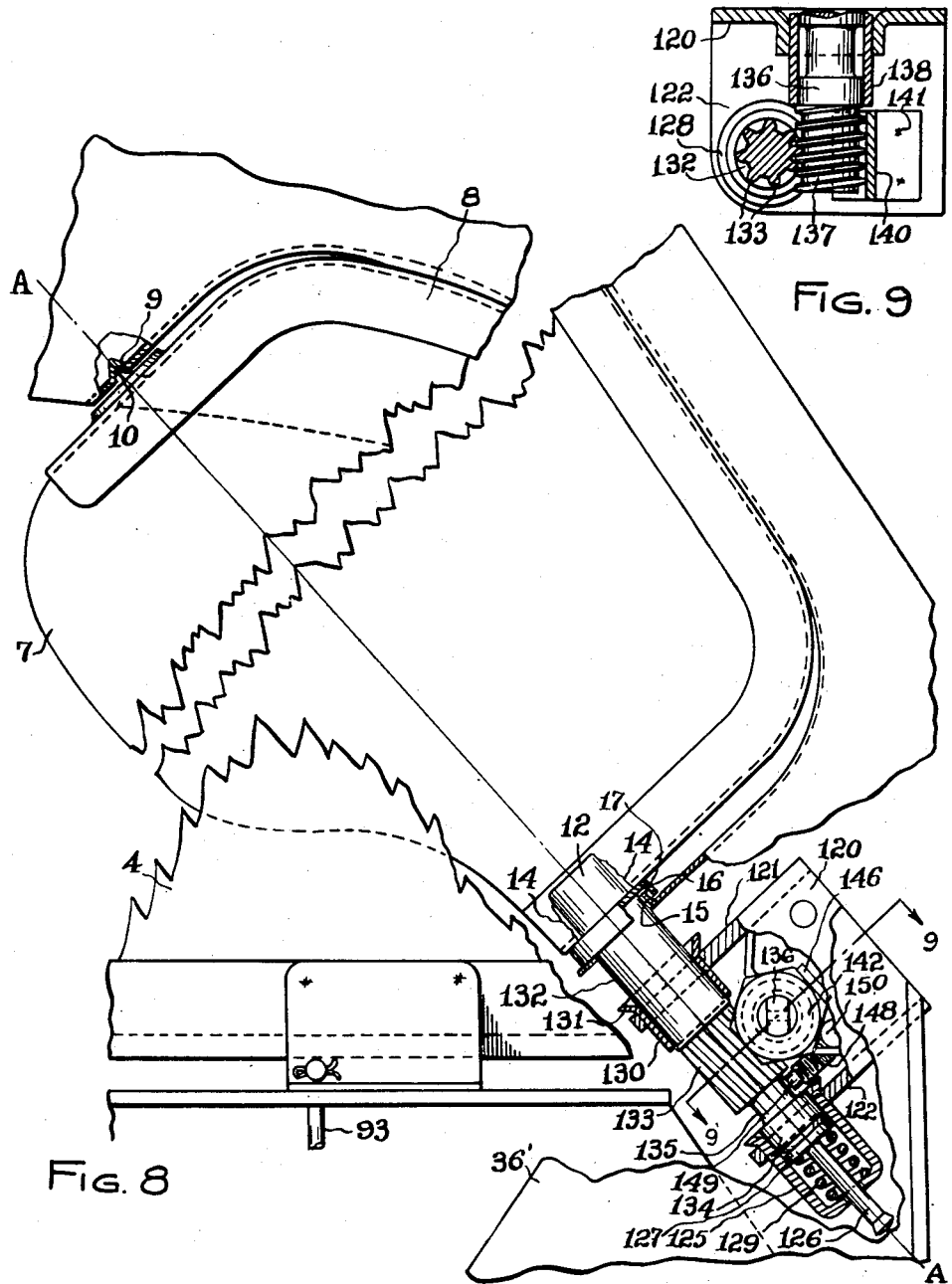

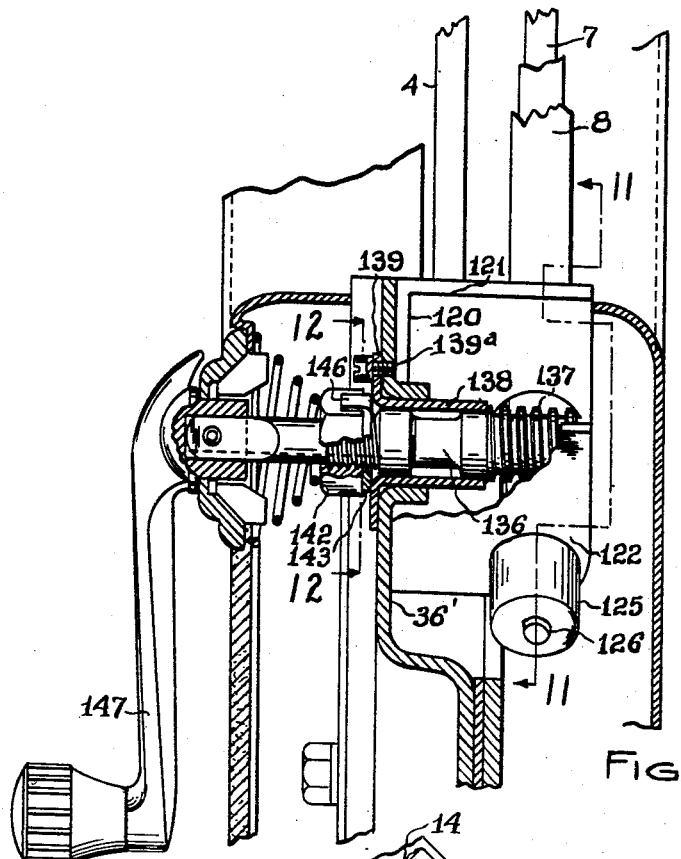
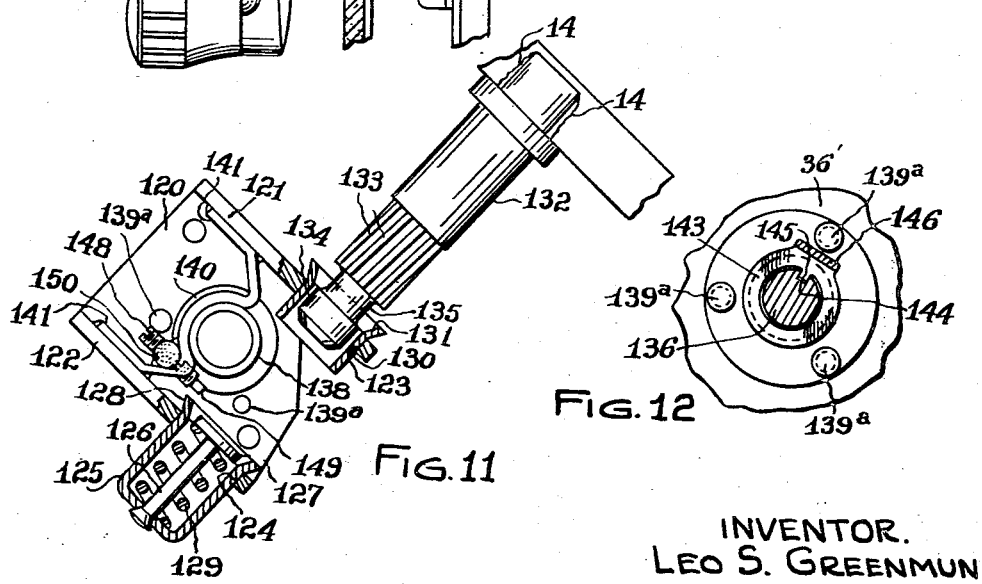

2,687,327

UNITED STATES PATENT OFFICE 2,687,327

MOUNTING FOR WING PANELS OF AUTOMOBILES AND THE LIKE

Leo S. Greenmun, Avoca, N. Y.

Original application October 12, 1945, Serial No. 622,032. Divided and this application May 24, 1951, Serial No. 228,090

11 Claims. (Cl. 296—44)

This invention relates generally to wing panel mountings for automobiles and the like.

A primary object of the invention is to provide novel means for mounting the swinging window or wing panel unit on an automobile, whereby removal of said unit for repair or replacement purposes is greatly facilitated.

Other objects and advantages of the invention will be apparent during the course of the following description.

In the accompanying drawing, forming a part of this specification, and in which like numerals are employed to designate like parts throughout the same, Fig. 1 is a fragmentary side elevational view of the left side door of an automobile, as viewed from the interior of the automobile, with portions broken away to more clearly show the operating mechanism for the sliding and swinging windows or window panels, and with both in fully closed position;

Fig. 2 is a view, on an enlarged scale, of a portion of Fig. 1;

Fig. 3 is a cross-sectional view, taken on the line 3—3 of Fig. 2;

Fig. 4 is a fragmentary view of certain of the parts shown in Fig. 2, as viewed from the opposite or reverse side;

Fig. 5 is a fragmentary cross-sectional view, taken in the line 5—5 of Fig 4;

Fig. 6 is a view similar to Fig. 2, but with portions broken away to more clearly show the mounting of the swinging window;

Fig. 7 is a cross-sectional view, taken on the line 7—7 of Fig 6;

Fig. 8 is a view similar to Fig. 2, but showing a modification of the invention in which the swinging window or window panel is regulated independently of the sliding window;

Fig. 9 is a cross-sectional view, taken on the line 9—9 of Fig. 9;

Fig. 10 is a view of certain of the operating parts of Fig. 8, as viewed from the right side of Fig. 8, with portions broken away to more clearly show the construction;

Fig. 11 is a fragmentary cross-sectional view, taken on the line 11—11 of Fig. 10, and Fig. 12 is a fragmentary cross-sectional view, taken on the line 12—12 of Fig. 10.

Referring more particularly to Figs. 1 to 7 inclusive of the drawings, there is illustrated, as viewed from the interior of the automobile, the left side door 1 of an automobile, the door being of more or less conventional form and construction and having a window opening 2, the front edge 3 of such opening sloping downwardly and forwardly, in accordance with conventional construction.

The door is provided with a sliding window 4, which, in outline, conforms generally with the shape of the window opening 2, and has a front edge 5 which is substantially parallel with the edge 3 of the window opening when the window is in fully closed position, the door frame being recessed for the reception of the edge 5 of the window. The window, it may be noted, fully closes the entire opening 2 of the window when in closed position, in contrast to conventional construction embodying a sliding window and a wing panel or shutter, which is swingable about a vertical or inclined axis, is relied upon to close the remainder or front portion of the window opening.

It may be further noted that the window 4 has an upper rear portion 4a which extends for a considerable distance above the adjacent edge of the window opening 2, when the window is in fully closed position. When the window 4 is to be opened or lowered, it is rotated about a horizontal axis, as will be presently described. In the initial stages of such opening movement, an opening of considerable area is formed between the front edge 5 of the window and the front edge 3 of the window opening 2 before an opening is formed between the portion 4a of the window and the adjacent portion of the opening 2. This permits ventilation of the automobile while maintaining the rear portion of the window closed; and is of considerable advantage during a rainstorm, when the occupants of the automobile, in the usual case, obtain ventilation only at the risk of being subjected or exposed to the rain, which enters through the ventilating opening. In the present case, there is an additional advantage, because, as will be presently explained, the swinging window or wing panel is maintained in closed position during the initial stages of the opening of the windows and thus prevents entry of rain into the ventilating opening formed between the front edge 5 of the window and the front edge 3 of the window opening 2.

In order to provide a desired type of no-draft ventilation for the automobile, a window or shutter 7 is provided, which extends substantially parallel with the edge 3 of the window opening 2, and is rigidly mounted in a U-shaped metallic frame 8 of channel-shaped cross-section. The window 7 is mounted on the door in such a manner as to be swingable about an up and down or inclined axis A—A (Figs. 1 and 8). The window 7, when in fully closed position, is disposed in a plane which is substantially parallel with the plane of the window 4, but spaced laterally and in an outboard direction from the latter plane. As best seen in Fig. 8, the web of the upper leg of the frame 8 is pressed outwardly to provide an embossment 9, which forms a pivot for entry into a conical seat 10 in the door frame.

The lower leg of the frame 8 is mounted in a slot 11 (Fig. 3) of the head 12 of a shaft or pin 13, the frame being permanently secured to the shaft by welding the frame to the head along the edges of the slot, as indicated at 14 in Figs. 6 and 8. The shaft 13 extends downwardly into an opening 15 (Fig. 8) provided therefor in the door frame, and for the purpose of providing a weather proof seal between the shaft and the point at which it enters the door frame, an inverted cup-shaped washer 16 is disposed about the head 12 of the shaft immediately below the frame 8, and is welded to the frame 8 or shaft head. The metal of the door frame is struck up about the shaft head to form a flange 17 of slightly smaller diameter than the flange of the washer 16, and the flange of the washer extends over the flange 17 to form a skirt for the latter, thereby providing a water-tight joint. The mounting of the frame 8 on the door is such that when the window 7 is in the fully open position and extends at about 90 degrees to the plane of the door, the window 7 may be moved sufficiently along the axis A—A to permit the window to be removed from the door, as will be presently explained.

Means have also been provided for regulating both the window 4 and the window 7 by means of the crank handle 65, and in a predetermined sequence in which the sliding window is first partially opened without opening the swingable window, and both windows are then fully and simultaneously opened. Such means is best shown in Figs. 2, 4, 5, 6 and 7.

Referring to these figures, it will be seen that the plate 23 is provided with an extension 23a having therein a cam slot consisting of two connected arcuate portions 71 and 72 which are curved oppositely to each other. The function of this cam slot will be presently described. The plate 36 is also provided with an extension 36a at its upper end to the outboard face of which a follower bracket 73 is rigidly secured. This bracket is of U-shaped form, having ears 74 and 75 provided respectively with circular openings 76 and 77 which are in axial alignment with the axis of the shaft 13. Mounted in the opening 77 and having a push fit therein is a spring retainer cup 78 in which a pin 79 is mounted for reciprocal movement axially of the cup, the pin having an enlarged head 80 at its upper end. The pin is constantly urged in an upward direction by a compression coil spring 81 which is disposed within the cup and bears against the head 80 of the pin. Mounted in the opening 76 is a cam follower member 82, which is rotatable within said opening but is secured against displacement from the ear 74 by means of peening 83. The member 82 has mounted therein a pin 84 on which is journalled a ball cam 85.

The shaft 13 has a portion 13a which extends through the cam member 82 and into the cup 78, the cup having a flared lip 86 which facilitates entry of the shaft into the cup when the swingable window 7 is installed on the door. The member 82 has a similar flared opening 82a for this purpose. The shaft 13 bears against the head 80 of the pin 79 with sufficient pressure to compress the spring 81, so that the spring resiliently maintains the pivot 9 in its conical seat 10 (Fig. 8).

The portion 13a of the shaft has a flat face 87 which is in engagement with a flat face 88 of the member 82, so that rotation of the cam member 82 is directly communicated to the shaft 13 to rotate the latter. An oil groove 89 is provided in the flat face 88 of the member 82, through which oil or grease may be forced to the wall of the opening 76, for lubricating the latter, to facilitate rotation of the member 82.

For the purpose of preventing unauthorized removal of the window 7 from the door, the shaft 13 is provided with an annular recess 90 into which the dog point of a set screw 91 extends, the set screw thus maintaining the shaft 13 against axial movement sufficient to remove the window 7. When, for any reason, it is desired to remove the window 7 from the door, it is only necessary to withdraw the point of the set screw from the recess 90, open the window to its fully open position, depress the window against the spring-pressed head 80 of the pin 79 sufficiently to release the pivot 9 from the seat 10, and to then pull the window unit outwardly and upwardly, so as to draw the shaft 13 thereof out of the cup 78 and the member 82. Replacement of the window unit is effected by a reversal of these movements.

When the window 7 is in the fully closed position, as shown in Fig. 1, the ball cam 85 is disposed in the upper end of the portion 71 of the cam slot.

With the various parts, as thus described, and assuming that the windows 4 and 7 are in the fully closed position shown in Fig. 1, and that the occupant of the automobile wishes to partially or slightly open the window 4, but not the window 7, a condition which is desired during a rainstorm, for example, the operator will turn the crank handle 65, thereby rotating the plate 23 sufficiently to produce this condition, the movement of the plate continuing until the ball 85 reaches the junction of the portions 71 and 72 of the cam slot.

During this movement, the window 4 will be partially opened, but due to the shape of the portion 71 of the cam slot, no movement of the window 7 will take place until the cam ball 85 passes the junction between the portions 71 and 72 of the cam slot. In other words, during this movement of the plate 23, the ball 85 remains stationary.

Upon continued movement of the crank handle, the plate 23 continues to rotate, and the portion 72 of the cam slot in the plate 23 begins to act on the ball 85, and through the medium of the member 82, causes the shaft 13 to be rotated, thereby causing the window 7 to be opened, the extent of this movement being limited by the engagement of the ball 85 with the lower end of the portion 72 of the cam slot, the window 7, at this point, extending at an angle of approximately 90 degrees to the door. The window 4, in the course of this movement of the window 7, has been fully opened, so that maximum ventilation of the automobile is effected.

It is to be particularly noted that the movements of the windows 4 and 7 are so synchronized that the window 4 is moved sufficiently to clear the rear edge of the window 7 as movement of the window 7 begins. This insures against breakage of either window or interference therebetween.

It is to be understood, of course, that the windows 4 and 7 may be opened to any position intermediate the fully closed and fully open positions, if desired.

Upon reversing the movement of the crank handle, the reverse of the aforesaid movements will be effected, that is to say, the window 7 will first be closed, and the window 4 nearly closed, after which the window 4 will be fully closed.

In Figs. 8, 9, 10, 11 and 12 of the drawings, I have shown a modification of the invention in which the swinging window 7 is regulated independently of the window 4.

Referring to these figures of the drawings, it will be seen that the plate 36' has secured to the upper end thereof a U-shaped mounting member 120, having legs 121 and 122 provided respectively with circular openings 123 and 124 which are in axial alignment with each other.

Secured, as by a push fit, in the opening 124, is a cup 125 which has mounted centrally therein a reciprocally movable pin 126 having an enlarged head 127. The cup 125 has a flared lip 128. A compression coil spring 129 is disposed within the cup 125 and bears against the head 127 of the pin 126. Similarly secured, as by a push fit, in the opening 123, is a sleeve 130 having a flared lip 131, similar to the lip 128.

The drive shaft 132 is secured to the window 7 in the same manner that the shaft 13 (Fig. 1) is secured to said window, but in this case, the shaft is provided with a circular portion which extends through the sleeve 130, a portion directly below the circular portion having helical gear teeth 133, and a lower end 134 of considerably smaller diameter than the helical gear portion 133. An annular recess 135 is formed in the shaft between the portions 133 and 134 thereof. The lower end 134 of the shaft bears directly upon the head 127 of the pin 126 and compresses the spring 129, as clearly shown in Fig. 19, the spring exerting an upward pressure against the window 7 which acts to maintain the pivot 9 in its conical seat 10.

A worm shaft 136 is provided having a worm 137 at one end thereof which is in mesh with the helical gear teeth 133. This worm shaft is retained in position in the member 120 by means of a bushing or sleeve 138, one end of which bears against one end of the worm 137 and the other end of which is provided with a flange 139, which bears against the inner face of the plate 36' and is secured to the latter as well as to the member 120 by means of screws 139a. The bushing 138 serves as a bearing for the shaft 136. The worm 137 is retained in mesh with the gear teeth 133 by means of a retainer member having an arcuate portion 140 which embraces and provides a bearing for the worm and arms 141 which are rigidly secured to the legs 121 and 122 of the mounting 120.

The shaft 136 is maintained against axial displacement by means of a lock nut 142 which is secured to a threaded portion of the shaft 136, being locked against rotation relatively to said shaft by means of a washer 143. Before securing the nut 142 to the shaft 136, the washer 143 is slid over the threaded portion of the shaft and against the flange 139, as shown in Fig. 21. To insure against rotation of the washer 143 relatively to the shaft, the washer is provided with an inwardly extending lug 144, which extends into a slot or keyway 145 which extends longitudinally of the shaft 136. After the nut 142 has been moved to the desired position, that is to say, into contact with the washer 143, a lug 146, with which the washer is provided, is bent into engagement with one of the side faces of the nut 142, thereby locking the nut against rotation relatively to the shaft 136.

The shaft 136 is driven by means of a crank handle 147.

In mounting the window 7, the shaft 132 is inserted in the opening 15, through the sleeve 130 and into the cup 125, the flared lips 128 and 131 facilitating entry of the shaft through the sleeve and into the cup. The assembly is further facilitated by virtue of the fact that the helical gear teeth 133 have a thread angle of less than 5°, and therefore readily enter the spaces between the convolutions of the worm 137. Moreover, the lower end 134 of the shaft 132, being of considerably smaller diameter than the diameter of the portion 133 of the shaft, readily passes the teeth of the worm 137. After the head 127 of the pin 126 has been depressed to a sufficient extent, the window is moved upwardly sufficiently to cause the pivot 9 to enter the seat 10, and the window is resiliently maintained in its mounted position by means of the spring 129.

In order to prevent unauthorized removal of the window from the door, a set screw 148 is provided having a dog point 149. The screw is threadedly mounted in a lug 150 which is welded to the retainer 140, the dog point 149 being disposed in the recess 135 of the shaft 132.

When it is desired to remove the window 7 for repair or replacement purposes the dog point 149 of the set screw is withdrawn from the recess 135, after which the window is pushed downwardly sufficiently to withdraw the pivot 9 from its seat 10, and the window can then be readily removed from the door.

It will be readily apparent that the mechanism shown in Figs. 8 to 12 inclusive can be quickly and easily substituted for the dual control mechanism of the previously described forms of the invention, where independent operation of the windows 4 and 7 is desired.

It is thus seen that I have provided means for mounting wing panel units, whereby removal of said units for repair or replacement is greatly facilitated.

It is to be understood that the forms of my invention herewith shown and described, are to be taken as preferred examples of the same, and that various changes in the shape, size and arrangement of parts may be resorted to, without departing from the spirit of my invention, or the scope of the subjoined claims.

This application is a division of my copending application Serial No. 622,032, filed October 12, 1945, and now Patent No. 2,559,120. Reference to said patent should be made for matter herein disclosed, but not claimed.

Having thus described my invention, I claim:

1. An automobile having a window mounted thereon for pivotal movement, a shaft extending from said window, said shaft having a portion formed as a helical gear, a second shaft having a worm in mesh with said gear, and a crank handle for rotating said last-named shaft, said helical gear being non-movable with respect to said first-named shaft, whereby said helical gear is disconnectible from said worm by upward movement of said window.

2. An automobile having a window mounted thereon for pivotal movement, a shaft extending from said window, said shaft having a portion formed as a helical gear, a second shaft having a worm in mesh with said gear, a crank handle for rotating said last-named shaft, and means resiliently bearing against said shaft to maintain said window in position on the automobile, said helical gear being rigid with respect to said first-named shaft, whereby said helical gear is disconnectible from said worm by upward movement of said window.

3. In combination in an automobile having a window opening surrounded in part by a metallic frame having a conical seat adjacent the upper portion of the window opening, a window mounted in said opening for pivotal movement about an up and down axis, passing through said seat, said window having a frame pressed outwardly at one point to provide a pivot for entry into said conical seat, and means resiliently maintaining said window in position with said pivot disposed in said seat.

4. The combination, as defined in claim 3, in which a shaft is secured to the frame of the window, said shaft being disposed at the lower portion of the window opening and having its axis in line with said up and down axis, and a spring-pressed plunger bears against the lower end of said shaft.

5. The combination, as defined in claim 4, in which a stationary mounting member is provided having bearing portions through which said shaft extends and means are provided for rotating said shaft to rotate said window.

6. An automobile having a window mounted therein for pivotal movement, a shaft extending from said window, a stationary mounting member having a bearing portion through which said shaft extends, means for rotating said shaft to rotate said window, a cup-shaped member mounted in said stationary member and into which the lower end of said shaft extends, a plunger mounted for reciprocal movement in said cup-shaped member, and spring means in said cup-shaped member resiliently urging said plunger against the lower end of said shaft.

7. An automobile, as defined in claim 6, in which a conical seat is provided, and said window has a pivot point which extends into said seat, said spring means maintaining said pivot point in said seat.

8. An automobile having a window mounted therein for pivotal movement, a shaft extending from said window, said shaft having an integral portion thereof formed as a helical gear, a second shaft having a worm in mesh with said helical gear, and a crank handle for rotating said second shaft, said helical gear being disconnectible from said worm by upward movement of said window.

9. An automobile, as defined in claim 8, in which the teeth of said helical gear have a thread angle of less than 5°.

10. An automobile, as defined in claim 9, including means resiliently bearing against first-named shaft.

11. An automobile having a window mounted therein for pivotal movement, a shaft extending from said window, said shaft having an integral portion thereof formed as a helical gear, a stationary mounting member having spaced openings through which said shaft extends, a cup-shaped member in one of said openings, a spring-pressed plunger disposed in said cup-shaped member and adapted to bear against the lower end of said shaft, a worm disposed within said supporting member and in mesh with said helical gear, and means for rotating said worm to rotate said shaft, said helical gear being removable with said window from said openings without disturbing said worm.

References Cited in the file of this patent

UNITED STATES PATENTS

| Number | Name | Date |
|---|---|---|
| 1,383,027 | Robertson | June 28, 1921 |
| 1,996,572 | Field | Apr. 2, 1935 |
| 2,053,854 | Vincent | Sept. 8, 1936 |
| 2,164,342 | Morrison | July 4, 1939 |
| 2,274,824 | Clark | Mar. 3, 1942 |
| 2,448,796 | Greenmun | Sept. 7, 1948 |